United States Patent Office  3,260,734
Patented July 12, 1966

3,260,734
1,1-ETHYLENE-17α-ALKYL-Δ²-5α-ANDROSTENE-17β-OL COMPOUNDS
Hans Müller, Friedmund Neumann, and Rudolf Wiechert, Berlin, Germany, assignors to Schering AG, Berlin, Germany
No Drawing. Filed Nov. 27, 1964, Ser. No. 414,452
Claims priority, application Germany, Feb. 1, 1964, Sch 34,562
13 Claims. (Cl. 260—397.3)

The present invention relates to new 1,1-ethylene-17α-alkyl-Δ²-5α-androstene-17β-ols and 17-esters thereof, and to the production of such compounds.

It is a primary object of the present invention to provide new 1,1-ethylene-steroid compounds and to provide methods of producing these compounds.

Other objects and advantages of the present invention will be apparent from a further reading of the specification and of the appended claims.

With the above and other objects in view, the present invention mainly comprises a compound of the formula:

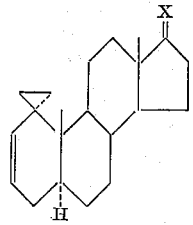

(I)

wherein =X is selected from the group consisting of =O and

wherein $R_1$ is selected from the group consisting of hydrogen and acyl, and wheerin $R_2$ is a lower alkyl.

In Formula I above, when X is oxygen, then the structural formula of the resulting compound is:

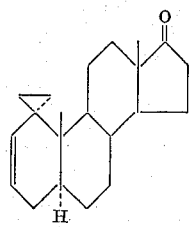

(II)

Further, when X is

then the resulting compound has the general formula:

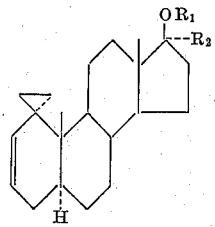

(III)

In Formula III above, when $R_1$ is acyl, then it is preferably derived from an aliphatic carboxylic acid of up to 12 carbon atoms, and most preferably from a lower aliphatic carboxylic acid. Howeevr, the acyl can be derived from any acid commonly used in esterificaion of alcohol groups of steroids.

The substituent $R_2$ is, as indicated above, a lower alkyl, and in this connection it can be either a saturated or unsaturated lower alkyl, such as methyl, ethyl, ethinyl or vinyl.

The compounds of Formula III above can be produced either by subjecting the 1,1-ethylene-Δ²-5α-androstene-17-one of Formula II above in known manner to Grignardation to introduce a 17α-position alkyl group or to analogously introduce a 17α-position ethinyl group, which can then be reduced to a vinyl group or to an ethyl group. The overall reaction proceeds as follows:

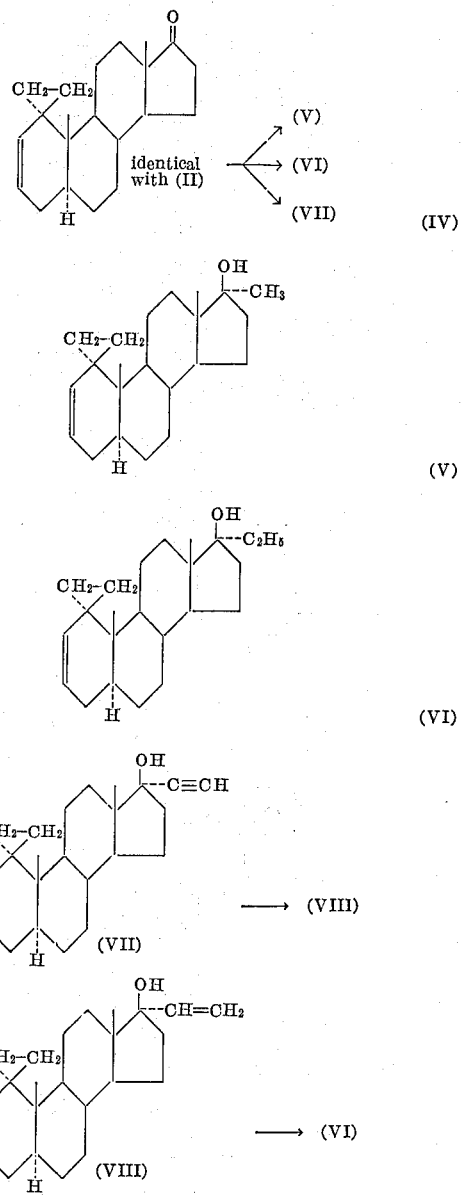

There is then carried out depending upon the desired meaning for $R_1$, an esterification of the primary prepared steroid alcohol with the desired acid or with a reactable acid derivative. It is clear that these esters can be prepared with any acid commonly used for the formation of esters of steroid alcohols. Aliphatic carboxylic acid of up to about 12 carbon atoms are most preferred.

The compound 1,1-ethylene-Δ²-5α-androstene-17-one (IV), which serves as intermediate in the production of compounds of Formula III above is itself a new compound. This new compound can be produced starting from 1-methyl-Δ¹-androstene-17β-ol-3-one, using per se known reactions, in accordance with the following reaction schema:

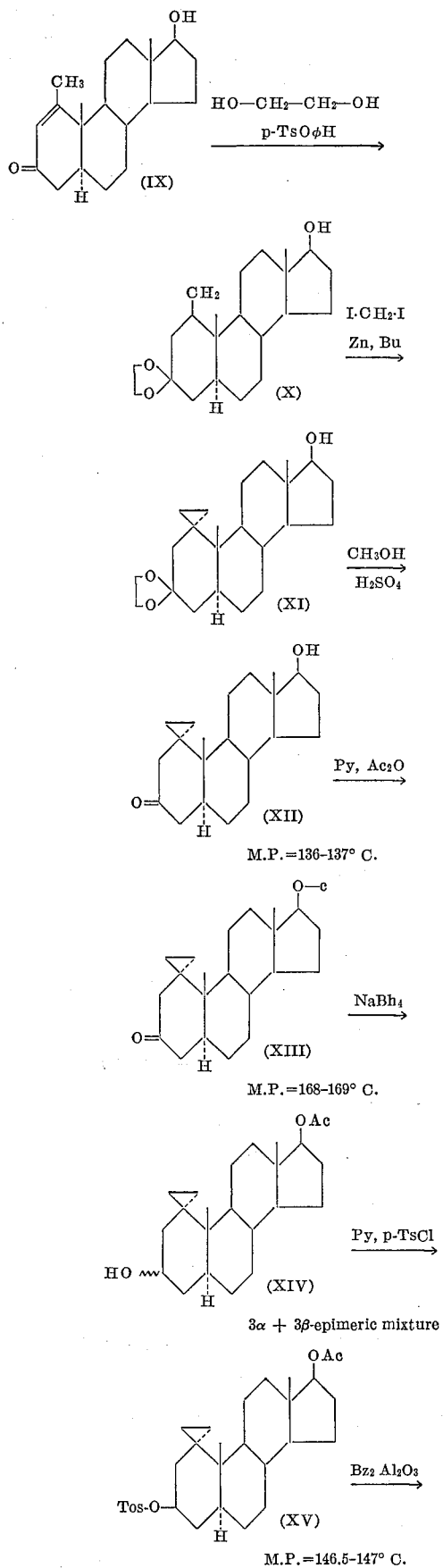

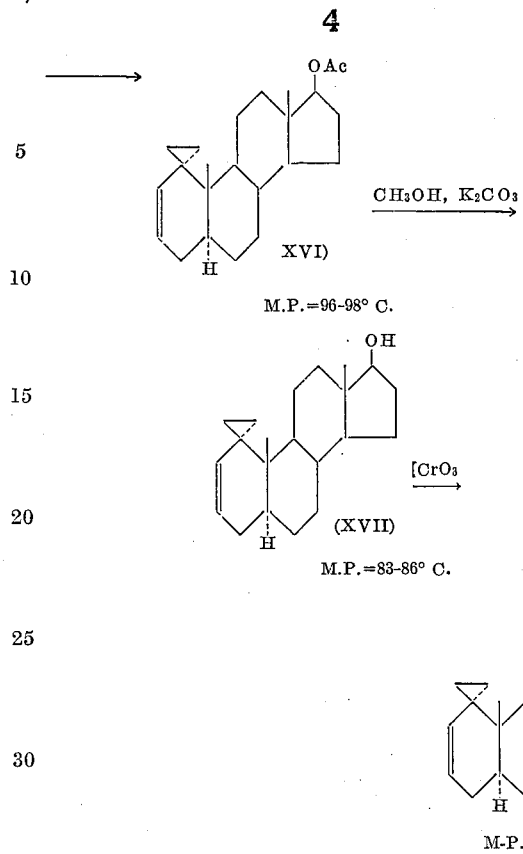

The following example describes the production of 1,1-ethylene-Δ²-5α-androstene-17-one:

EXAMPLE A 5.47 g. of 1-methyl-Δ¹-androstene-17β-ol-3-one in 270 cc. of absolute benzene are heated for 5 hours under reflux and under nitrogen with 13.7 cc. of ethylene glycol and 137 mg. of p-toluene sulfonic acid. The resulting water is continuously removed. The reaction solution is diluted with benzene, washed with water until neutral, dried over sodium sulfate, and concentrated to dryness under vacuum. The ketalization proceeds with rearrangement of the nuclear Δ¹⁽²⁾-double bond into the exocyclic position Δ¹⁽¹'⁾. The resulting ketal (X) melts after recrystallization from ethyl acetate at 178–179° C. The yield is 4.44 g.

34 cc. of methylene iodide and 41.9 g. of zinc (copper) J. Org. Chem. 24, 1825 (1959)), are added in 10 portions in two hour intervals to the boiling solution of 13.9 g. of 1-methylene-3-ethylene-dioxy-5α-androstane-17β-ol (X) in 350 cc. of absolute ether and 60 cc. of methylene chloride. After cooling and filtering off of the zinc, the filtrate is diluted with ether, washed three times with 2 n hydrochloric acid and with water, dried over sodium sulfate, and evaporated to dryness under vacuum.

The residue of 1,1-ethylene-3-ethylenedioxy-5α-androstane-17β-ol (XI) and 1-methylene-3-ethylenedioxy-5α-androstane-17β-ol (X) in 1.5 liters of methanol is heated under refluxing with 150 cc. of 8 vol. percent sulfuric acid for 30 minutes, concentrated to ¼ of its original volume, diluted with ice water, carefully neutralized with sodium bicarbonate solution, and extracted with methylene chloride. After washing until neutral, drying and evaporation of the methylene chloride, the oily residue is subjected to chromatography over silica gel with cyclohexane-ethyl acetate mixtures, and recrystallized from isopropyl ether. There is thus obtained 2.85 g. of 1,1-ethylene-5α-androstane-17β-ol-3-one (XII) having a melting point of 136–137° C.

2.85 g. of 1,1-ethylene-5α-androstane-17β-ol-3-one (XII) are allowed to stand overnight at room temperature with 10 cc. of absolute pyridine and 5 cc. of acetanhydride. The reaction mixture is stirred into ice cold sodium chloride solution. The precipitate is filtered off, washed and dried. After recrystallization from hexane-methylenechloride there is obtained 2.58 g. of 1,1-ethylene-5α-androstane-17β-ol-3-one-17-acetate (XIII) having a melting point of 168–169° C.

300 mg. of sodium borohydride are introduced in portions under stirring at room temperature into a solution of 2.33 g. of 1,1-ethylene-5α-androstane-17β-ol-3-one-17-acetate (XIII) in 200 cc. of methanol and 4.9 cc. of water. The stirring is then continued for an additional 30 minutes and the reaction mixture is then poured into an ice cold sodium chloride solution (2.5 liters). The resulting precipitate is filtered off, washed until neutral and taken up in methylene chloride while still wet. The methylene chloride phase is dried and eveporated. The residue consists of 2.5 g. of crystalline material which melts at between 167 and 178° C. and consists of a mixture of the 3β- and 3α-OH compound (XIV).

2.5 g. of the epimeric mixture (XIV), 2.5 g. of p-toluene sulfochloride and 10 cc. of absolute pyridine are permitted to stand overnight at room temperature. The reaction mixture is then poured into 0.5 liter of aqueous sodium bicarbonate solution and stirred for 1 hour. The residue is filtered off, washed with water, dissolved in methylene chloride, dried and evaporated. There is thus obtained 3.3 g. of 1,1-ethylene-5α-androstane-3β,17β-diol-3-tosylate-17-acetate (XV) having a melting point of 146.5–147° C. UV: $\epsilon_{225}$=13 200 (MeOH).

The crude product is dissolved in benzene and introduced into a column with 200 g. of aluminum oxide (neutral, 1% water content). By eluation with benzene there is obtained 1.62 g. of 1,1-ethylene-Δ²-5α-androstene-17β-ol-17-acetate (XVI) having a melting point of 96–98° C.

1.5 g. of 1,1-ethylene-Δ²-5α-androstene-17β-ol-17-acetate (XVI) in 30 cc. of methanol are heated for 90 minutes under refluxing and under nitrogen with 2.04 g. of potassium carbonate in 5.25 cc. of water. 2.1 cc. of glacial acetic acid is subsequently added. The reaction mixture is cooled and diluted with water. The precipitate is filtered off, washed to neutral and dried. The white residue consists of 1,1-ethylene-Δ²-5α-androstene-17β-ol (XVII) and melts at 83–86° C. The yield amounts to 1.35 g.

4.95 g. of 1,1-ethylene-Δ²-5α-androstene-17β-ol (XVII) are dissolved in 250 cc. of acetone, the solution is cooled at 5° C., and 1.64 g. of chromium-(VI)-oxide in 6.3 cc. of 8 n sulfuric acid are added dropwise under stirring to the solution. The stirring is continued for an additional 3 minutes, the excess oxidation agent is destroyed with some methanol, and the reaction solution is then poured into 5 liters of ice water. The precipitate is filtered off, washed with water, taken up in methylene chloride; the methylene chloride phase is dried and evaporated. There remains 1,1-ethylene-Δ²-5α-androstene-17-one (IV).

The new 1,1-ethylene-17α-alkyl-Δ²-5α-androstene-17β-ols and their 17-esters of the present invention (Formula III above) are themselves extremely valuable pharmaceutical products which are particularly valuable as anabolic agents.

Thus, for example, the compound 1,1-ethylene-17α-methyl-Δ²-5α-androstene-17β-ol is a perorally strongly active anabolic agent without marked androgenic side effects. Its peroral anabolic and androgenic activities were determined according to standard methods on castrated male rats using the levator ani test and the seminal vesical test, and the corresponding activities were compared with the activities of several known anabolic agents, with 17α-methyltestosterone being used as the standard substance for comparison. The values are summarized in Table I below:

Table I

| Substance: 12×3 mg. p.o. | Levator ani, mg./100 g. wt.—rats | Seminal vesical, mg./100 g. wt.—rats |
|---|---|---|
| 17α-methyltestosterone | 25 | 49 |
| 4-hydroxy-17α-methyltestosterone | 40 | 88 |
| 17α-methyl-pyrazolo-[3,2-c]-5α-androstane-17β-ol | 26 | 28 |
| 1,1-ethylene-17α-methyl-Δ²-5α-androstene-17β-ol | 34 | 34 |

It is clear from the foregoing table that the new compound of the present invention is not only considerably more active than methyltestosterone with respect to a strengthened anabolic activity and lowered androgenic side effect, but it is, in addition, highly advantageous as compared to well known and valued anabolic agents in that it possesses a better dissociation of this action (from the androgenic side effect) or an absolute increase in anabolic activity.

The compounds of the present invention are not only valuable as anabolic agents, but they are also valuable ovulation-inhibiting agents.

Thus, the 1,1-ethylene-17α-alkyl-Δ²-5α-androstene-17β-ols and their 17-esters exhibit marked ovulation-inhibiting activity. Compared to known ovulation-inhibiting agents, such as 17α-ethinyl-19-nor-testosterone and its 17-acetate, the new 1,1-ethylene-17α-methyl-Δ²-5α-androstene-17β-ol of the present invention upon peroral administration to normal female rats is three times as strong. For this determination, the occurring or not occurring ovulation was determined by tube inspection.

Table II below sets forth the activity dose ($AD_{50}$), which upon peroral administration causes 50% of the animals to cease ovulation.

Table II

Substance:
  $AD_{50}$, p.o. mg./animal/day (4 days' duration)
  17α-ethinyl-19-nortestosterone _____ 3
  17α-ethinyl-19-nortestosterone-17-acetate _____ 3
  1,1 - ethylene - 17α - methyl - Δ² - 5α - androstene 17β-ol _____ 1

The following examples are given to further illustrate the present invention. The scope of the invention is not, however, meant to be limited to the specific details of the examples.

EXAMPLE 1

4.1 g. of 1,1-ethylene-Δ²-5α-androstene-17-one (IV) in 148 cc. of absolute benzene are added dropwise to cooled Grignard solution produced from 4.49 g. of magnesium turnings in 50 cc. of absolute ether and 11.6 cc. of methyl iodide in 32.4 cc. of absolute ether, and the reaction mixture is stirred for 4 hours at room temperature under nitrogen. Then concentrated aqueous ammonium chloride solution is carefully added while cooling from the outside with ice, the reaction mixture is slightly acidified with dilute hydrochloric acid, and is then extracted with ether. The ethereal phase is washed neutral, dried and evaporated. The residue is subjected to chromatography over silica gel. By eluation with carbon tetrachloride/methylene chloride (1+1 and 1+3) there is obtained 3.36 g. of 1,1-ethylene-17α-methyl-Δ²-5α-androstene-17β-ol with a melting point of 125–126° C.

EXAMPLE 2

The cooled Grignard reagent prepared from 6.08 g. of magnesium turnings in 75 cc. of absolute tetrahydrofurane and 19 cc. of ethyl bromide in 75 cc. of tetrahydrofurane is added to 90 cc. of absolute tetrahydrofurane, through which acetylene had been conducted previously for 20 minutes. This results in an increase in the temperature to 45° C. Additional acetylene is passed therethrough until the temperature again falls. 3 g. of 1,1-ethylene-Δ²-5α-androstene-17-one (IV) in 75 cc. of absolute tetrahydrofurane are then added dropwise. During the dropwise addition, acetylene is continuously passed through the mixture. The reaction mixture is then heated in an oil bath under nitrogen and under stirring for 21 hours at 70° C.

After cooling to 5° C., concentrated aqueous ammonium chloride solution is slowly added until no reaction occurs. The reaction mixture is then extracted with ether, the organic phase is washed with water until neutral, dried over sodium sulfate, concentrated to dryness under vacuum, and the residue is subjected to chromatography over silica gel. By eluation with carbon tetrachloride/methylene chloride (2+1) there is obtained 1.31 g. of 1,1-ethylene-17α-ethinyl-Δ²-5α-androstene-17β-ol as an oil.

$[\alpha]_D^{30} = +60°$ (CHCl$_3$; c.=1).

EXAMPLE 3

325 mg. of the 1,1-ethylene-17α-ethinyl-Δ₂-5α-androstene-17β-ol produced according to Example 2 are dissolved in 30 cc. of pyridine and hydrogenated by the addition of 60 mg. of 5% palladium/carbon catalyst until 1 mmol of hydrogen is taken up. The catalyst is then filtered off and the solution is concentrated to dryness under vacuum. The residue is taken up in ether, the ethereal phase is washed with 1 n hydrochloric acid and water, dried over sodium sulfate and concentrated by evaporation. There remains 240 mg. of 1,1-ethylene-17α-vinyl-Δ²-5α-androstene-17β-ol. The melting point is 78–81.5° C.

EXAMPLE 4

3.46 g. of 1,1-ethylene-Δ²-5α-androstene 17-one (IV) in 130 cc. of absolute benzene are added dropwise to cooled Grignard solution produced from 3.94 g. of magnesium turnings in 44 cc. of absolute ether and 10.2 cc. of ethyl iodide in 28.4 cc. of absolute ether. The reaction mixture is stirred under nitrogen at room temperature for 7 hours. Then, under cooling with ice from the outside, concentrated aqueous ammonium chloride solution and subsequently dilute hydrochloric acid solution until a weakly acid reaction occurs are carefully added.

The organic phase is separated and the aqueous phase is extracted with ether. After washing to neutral, drying and evaporation of the purified organic phase, the residue is subjected to chromatography over silica gel with carbon tetrachloride/methylene chloride (2+1). There is thus obtained 1.05 of 1,1-ethylene-17α-ethyl-Δ²-5α-androstene-17β-ol, which melts at 117–118.5° C.

EXAMPLE 5

1 g. of the 1,1-ethylene 17α-methyl-Δ²-5α-androstene-17β-ol produced according to Example 1, 5 cc. of absolute pyridine and 5 cc. of acetic acid anhydride are heated for 4 hours at 130–140° C. The reaction mixture is then stirred into ice cold sodium chloride solution filtered off and washed with water until neutral. The dark brown residue is recrystallized two times from isopropyl ether over carbon.

There is thus obtained 630 mg. of 1,1-ethylene-17α-methyl-Δ²-5α-androstene-17β-ol-17-acetate as colorless crystals which melt at 130.5–131.5° C.

Without further analysis, the foregoing will so fully reveal the gist of the present invention that others can by applying current knowledge readily adapt it for various applications without omitting features that, from the standpoint of prior art, fairly constitute essential characeristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula:

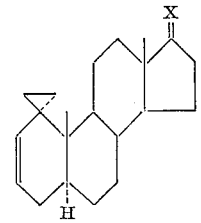

wherein X is selected from the group consisting of

wherein R$_1$ is selected from the group consisting of hydrogen and acyl derived from an aliphatic carboxylic acid of up to 12 carbon atoms, and wherein R$_2$ is lower alkyl.

2. A compound of the formula:

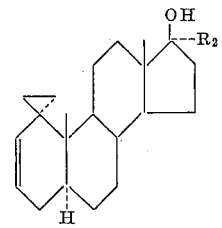

wherein R$_2$ is lower alkyl.

3. A compound of the formula:

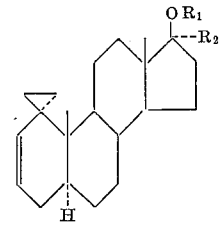

wherein R$_1$ is acyl derived from an aliphatic carboxylic acid of up to 12 carbon atoms, and wherein R$_2$ is lower alkyl.

4. 1,1-ethylene-Δ²-5α-androstene-17-one.
5. 1,1-ethylene-17α-methyl-Δ²-5α-androstene-17β-ol.
6. A 17-aliphatic carboxylic acid ester of 1,1-ethylene-17α-methyl-Δ²-5α-androstene-17β-ol.
7. 1,1 - ethylene - 17α - methyl - Δ² - 5α - androstene-17β-ol-17-acetate.
8. 1,1-ethylene-17α-ethinyl-Δ²-5α-androstene-17β-ol.
9. An aliphatic carboxylic acid ester of 1,1-ethylene-17α-ethinyl-Δ²-5α-androstene-17β-ol wherein said aliphatic carboxylic acid contains up to 12 carbon atoms.
10. 1,1-ethylene-17α-vinyl-Δ²-5α-androstene-17β-ol.
11. An aliphatic carboxylic acid ester of 1,1-ethylene-17α-vinyl-Δ²-5α-androstene-17Β-ol wherein said aliphatic carboxylic acid contains up to 12 carbon atoms.
12. 1,1-ethylene-17α-ethyl-Δ²-5α-androstene-17β-ol.
13. An aliphatic carboxylic acid ester of 1,1-ethylene-17α-ethyl-Δ²-5α-androstene-17β-ol wherein said aliphatic carboxylic acid contains up to 12 carbon atoms.

References Cited by the Examiner

UNITED STATES PATENTS 3,210,389   10/1965   Bowers _____ 260—397.4

LEWIS GOTTS, *Primary Examiner.*

ELBERT L. ROBERTS, *Assistant Examiner.*

UNITED STATES PATENT OFFICE
CERTIFICATE OF CORRECTION

Patent No. 3,260,734                      July 12, 1966

Hans Müller et al.

It is hereby certified that error appears in the above numbered patent requiring correction and that the said Letters Patent should read as corrected below.

Column 3, formula "(IX)" for that portion reading "p-TsØH" read -- p-TsOH --.

Signed and sealed this 2nd day of January 1968.

(SEAL)
Attest:

Edward M. Fletcher, Jr.                       EDWARD J. BRENNER

Attesting Officer                           Commissioner of Patents